(12) United States Patent
Deng et al.

(10) Patent No.: US 9,819,001 B2
(45) Date of Patent: Nov. 14, 2017

(54) LAMINATED LITHIUM BATTERY MODULE

(71) Applicant: Microvast Power Systems Co.,Ltd., Huzhou, Zhejiang Province (CN)

(72) Inventors: Guoyou Deng, Huzhou (CN); Yang Wu, Huzhou (CN); Feng Guo, Huzhou (CN)

(73) Assignee: MICROVAST POWER SYSTEMS CO., LTD., Huzhou, Zhejiang (CN)

( * ) Notice: Subject to any disclaimer, the term of this patent is extended or adjusted under 35 U.S.C. 154(b) by 0 days.

(21) Appl. No.: 14/601,143

(22) Filed: Jan. 20, 2015

(65) Prior Publication Data

US 2017/0084899 A1 Mar. 23, 2017

(30) Foreign Application Priority Data

Jan. 21, 2014 (CN) .......................... 2014 1 0026625

(51) Int. Cl.
*H01M 2/26* (2006.01)
*H01M 2/10* (2006.01)
*H01M 2/18* (2006.01)
*H01M 2/30* (2006.01)
*H01M 10/0525* (2010.01)
(Continued)

(52) U.S. Cl.
CPC ........... *H01M 2/26* (2013.01); *H01M 2/1077* (2013.01); *H01M 2/18* (2013.01); *H01M 2/305* (2013.01); *H01M 4/661* (2013.01); *H01M 10/0525* (2013.01); *H01M 10/0585* (2013.01); *H01M 10/482* (2013.01); *H01M 10/486* (2013.01); *H01M 2004/027* (2013.01); *H01M 2004/028* (2013.01); *H01M 2220/20* (2013.01)

(58) Field of Classification Search
CPC combination set(s) only.
See application file for complete search history.

(56) References Cited

U.S. PATENT DOCUMENTS 6,399,232 B1 * 6/2002 Eshraghi ............. H01M 2/1022
29/623.1
6,982,132 B1 * 1/2006 Goldner .................... E06B 9/24
204/192.11
(Continued)

FOREIGN PATENT DOCUMENTS

CN 101800329 A 8/2010
CN 202487722 U 10/2012
(Continued)

*Primary Examiner* — Imran Akram
(74) *Attorney, Agent, or Firm* — Cheng-Ju Chiang

(57) ABSTRACT

The present invention provides a battery module, comprising a battery cell and a current collector sheet, the battery cell is provided with a positive electrode tab and a negative electrode tab, the positive electrode tab and the negative electrode tab are located at the opposite ends of the battery cell, the adjacent battery cells form a Z-type arrangement through the current collector sheet by putting the tabs in series, the said positive electrode tab of the battery cell is an aluminum foil tab or a copper foil tab, the negative electrode tab is a copper foil tab or an aluminum foil tab, and the material of the positive electrode tab and that of the negative electrode tab are not the same, the said current collector sheet is a combined current collector sheet, the current collector sheet is combined by an aluminum sheet and a copper sheet.

19 Claims, 5 Drawing Sheets

(51) Int. Cl.
*H01M 10/0585* (2010.01)
*H01M 10/48* (2006.01)
*H01M 4/66* (2006.01)
*H01M 4/02* (2006.01)

(56) References Cited

U.S. PATENT DOCUMENTS

| | | | | |
|---|---|---|---|---|
| 2005/0022370 | A1* | 2/2005 | Fu | H01M 2/1653 29/623.5 |
| 2008/0187825 | A1* | 8/2008 | Kawabata | H01M 2/16 429/144 |
| 2011/0159353 | A1* | 6/2011 | Byun | H01M 2/206 429/160 |
| 2012/0058371 | A1* | 3/2012 | Carignan | H01M 2/266 429/61 |
| 2012/0082876 | A1* | 4/2012 | Yamamoto | H01M 2/10 429/90 |
| 2012/0088140 | A1* | 4/2012 | Kardasz | H01M 4/13 429/120 |
| 2012/0188714 | A1* | 7/2012 | Von Borck | H01M 2/1061 361/688 |
| 2013/0045401 | A1* | 2/2013 | Yoon | B60L 11/187 429/90 |

FOREIGN PATENT DOCUMENTS

| | | |
|---|---|---|
| CN | 103035875 A | 4/2013 |
| CN | 103427063 A | 12/2013 |
| CN | 203733872 U | 7/2014 |
| JP | 2004-71178 A | 3/2004 |

* cited by examiner

LAMINATED LITHIUM BATTERY MODULE

CROSS-REFERENCE TO RELATED APPLICATIONS

The present application is based on and claims benefit from Chinese Patent Application No. CN201410026625.5 and filed on Jan. 21, 2014. The same invention disclosure of the above identified Chinese patent application is also filed as Chinese Patent Application No. CN201420036298.7, filed on Jan. 21, 2014, with a Chinese Patent No. 203733872U which is allowed to be filed by Chinese Patent Laws and Rules. The entire disclosure of the above-identified applications, including the specifications, drawings and claims are hereby incorporated herein in their entirety by reference.

FIELD OF THE INVENTION

This invention relates to a battery module, more specifically relates to a soft-package battery module.

BACKGROUND OF THE INVENTION

Lithium-ion battery is a green battery of high average output voltage, large output power, low self-discharge, no memory effect, wide operating temperature range (between −20° C.~60° C.), excellent cycling performance, high charge-discharge efficiency, long service life and contains non-toxic and hazardous substances. It relies on the lithium-ions' round-trip of embedding and de-embedding between a negative electrode and a positive electrode to complete battery charging and discharging operations.

While electric vehicles have many advantages when compared to conventional vehicles, but there are still many problems when the lithium-ion battery pack is applied to the electric vehicles, the most significant problem to be resolved is the group technology of the lithium-ion battery, the most involved problem is the energy density of the battery pack, which directly affects the mileage of the electric vehicles.

Energy density of the lithium-ion battery pack is mainly determined by the framework of the battery pack, usually the lithium-ion battery cells are collected in parallel first, then the parallel modules are collected in series, and the connection of tabs of the battery cell requires the use of the current collector sheet, in the prior art, the parallel connection of the battery cells is welding the taps of the battery cell directly on the current collector sheet, while the series connection is using wires to connect the current collector sheets; but combination of this battery module has the following disadvantages: 1. when the battery is in the process of operation, it is easy to loose the welding point between the wires and the current collector sheet while under vibration or shocking, the results includes pseudo soldering and desoldering; 2. for there are other wires for sampling such as sampling lines in existence, then the adding of the wires, makes the internal battery more complicated or messy, and furthermore it takes up too much real estate or space.

Patent with application No. CN201010142205.5, titled "the battery pack" discloses a battery pack composed of a plurality of soft-package battery cells, which includes connecting means that connect the two batteries, the batteries and the connecting means are connected together by wires, thus the space of the battery pack is occupied via a large foot print or greatly, the energy density is reduced, and the welding between the wires and the connecting means is spot welding, it tends to become loose by shocking in the operation process, and thus results in pseudo soldering and desoldering.

Again, among the products that the Tesla company puts on the market, the battery module of the product with maximum energy density used by the ModelS has the size of length 2.7 m, width 1.5 m, thickness 0.1 m to 0.18 m, is composed of 7600 batteries of 18650, for a 18650 battery cell, the battery shell is approximately 0.02 dm, the electrode sheet's length is 0.65-0.05 after removing the top and bottom members of the battery, therefore the volume of the electrode sheets of the 18650 battery cell is $3.14*((0.18-0.004)/2)^2*(0.6)=0.0146$ liters, the volume of the electrode sheets used in the batteries of the entire vehicle is $0.0146*7600=111$ liters, the volume of the battery module is $27*15*1+3*15*0.8=441$ L. In summary, the volume ratio that the electrode sheets occupied the battery pack (Electrode Volume Ratio hereinafter is abbreviated as EVR) is $111/441=25.2\%$, under the same conditions that the other materials are the same, the higher proportion the electrode sheets take, the higher energy density of the battery pack is, the lower the contrary, 25.2% of EVR for the electric vehicle has greater constraints to the improvement of the volume energy density, it is not conducive for the arrangement of the power battery to make the mileage of power battery electric vehicles with the indicators of the traditional vehicle in order to meet the needs of customers (the single fuel mileage of the traditional vehicle is almost 600 kilometers, while the longest mileage of Tesla is only about 400 kilometers through a single charge).

Moreover what the battery pack uses is the cylindrical battery cell, the cylindrical battery cell can be welded to the connecting pieces only by spot welding, and because the contact area is small between the poles of the battery cell and the connecting pieces, so this reduces the current through capacity, also increases the heat, and combining such number of cylindrical battery cells into the battery pack, the heat generated will be very great or significant, the design for heat-dissipation will be more complicated, also more energy will be wasted, these further reduce the effective use of the energy in the overall lithium-ion battery pack.

SUMMARY OF THE INVENTION

The object of the present invention is to provide a battery module, including battery cells and current collector sheets, said battery cell is provided with a positive electrode tab and a negative electrode tab, the said positive electrode tab and the negative electrode tab are located at the opposite ends of the battery cell, the adjacent battery cells are connected in series or parallel to form a Z-shaped arrangement by the current collector sheet.

The battery module of this invention, wherein, the length of the battery cell to the width of the battery cell is 2:1 to 8:1; using the aspect ratio of 2:1 to 8:1 for a soft-package battery cell is better for increasing the volume density, thereby increasing the energy density of the entire battery pack. Preferably, the length of the battery cell to the width of the battery cell is 4:1 to 6:1.

The positive electrode tab of the said battery cell is an aluminum foil tab or a copper foil tab, the negative electrode tab is a copper foil tab or an aluminum foil tab, and the material of the positive electrode tab and that of the negative electrode tab are different, the said current collector sheet is a combined current collector sheet, the said current collector sheet is made by the combination of an aluminum sheet and a copper sheet. According to another embodiment of the present invention, the positive electrode tab and the negative electrode tab can be the aluminum foil tab or the copper foil tab at the same time, in this case, the current collector sheet may use single aluminum or single copper.

When the positive electrode tab of the said battery cell is an aluminum foil tab or a copper foil tab, the negative electrode tab is an aluminum foil tab or a copper foil tab, and the material of the positive electrode tab and that of the negative electrode tab are different, when assembled into the battery pack, for connecting the battery cells in parallel, it is only need to weld the tabs with the same materials together, if there is a need to put the battery cells in series, then it is necessary to weld the copper foil tab and the aluminum foil tab on the current collector sheet, for the current collector sheet is made by the combination of the aluminum sheet and the copper sheet, so it is only need to weld the copper foil tab to the copper sheet, weld the aluminum foil tab to the aluminum sheet, the battery cells are connected to form a Z-shaped arrangement by a series connection or a parallel connection of the current collector sheet. This battery pack structure increases the EVR (Electrode Volume Ratio) of the battery pack, thereby increasing the energy density of the battery pack, the following embodiment will make further description through the comparison of the EVR of the conventional cylindrical battery pack with the EVR of the battery pack of this invention.

In a specific embodiment, the said aluminum sheet and the copper sheet may be fixed by riveting, may also be fixed by welding.

For connecting the aluminum sheet and the copper sheet together, riveting can not only guarantee the stability of the connection, but also ensure the high current through capacity of the large current.

In a specific embodiment, the said aluminum sheet and the copper sheet are respectively provided with a welding groove.

Setting the welding groove on the aluminum sheet and the copper sheet respectively is convenient for the welding of the positive electrode tab and the negative electrode tab.

In a specific embodiment, the said copper foil tab is welded on the welding groove of the copper sheet; the said aluminum foil tab is welded on the welding groove of the aluminum sheet.

Welding the copper foil tab on the welding groove of the copper sheet, welding the aluminum foil tab on the groove of the aluminum sheet can guarantee the welding strength between the tab of the battery cell and the current collector sheet. In a specific embodiment, the said copper foil tab and the welding groove of the copper sheet are fully welded; the said aluminum foil tab and the welding groove of aluminum sheet are fully welded.

In the prior art, the welding between the tabs and the current collector sheet is mostly spot welding, and the method of using wires to connect the current collector sheet must use wires to realize the parallel connection and the series connection, however, after long-term use, pseudo soldering and desoldering will exist in spot welding, which greatly affect the life of the battery pack, and can also easily lead to dangerous; for taking the use of new current collector sheet, the traditional wire connections can be avoided, the tabs and the welding groove of the current collector sheet are fully welded, and this increases the contact area, reduces the resistance, and has an excellent effect for suppressing the heat generation of the battery pack. Moreover, using unique design of the battery cell and the current collector sheet, and with Z-type arrangement greatly improve the energy density of the battery pack.

In a specific embodiment, a separator is provided between the adjacent battery cells, the surface area of the said separator is larger than the surface area of the battery cell.

After the group design of the battery cell, in order to pursue the stability of the battery pack and the energy density of the battery pack, the space between the battery cells is compressed as much as possible, this is easy to cause the heat-distribution uneven. Setting separators between the battery cells helps to evenly distribute the heat generated in the cell.

In a specific embodiment, the said separator is provide with concave and convex patterns, the said concave and convex patterns distribute over the entire separator. Setting the concave and convex pattern on the separator, is conducive to increase the surface area of the separator, increase the contact areas between the separator and the battery cell, enhance the heat-dissipation capability of the separator, it is better for the internal of the battery pack to get a more uniform temperature.

In a specific embodiment, the concave and convex patterns are selected from at least one of the diamond-shaped concave and convex patterns, square-shaped concave and convex patterns, triangle-shaped concave and convex patterns, strip-shaped concave and convex patterns, orange peel-shaped concave and convex patterns.

The concave and convex patterns are selected from at least one of the diamond-shaped concave and convex patterns, square-shaped concave and convex patterns, triangle-shaped concave and convex patterns, strip-shaped concave and convex patterns, orange peel-shaped concave and convex patterns, patterns extends from the bottom to the top of the separator, this is easy for processing, meanwhile the increased surface area is better for getting the better heat-dissipation effect.

Both ends of the tabs of the said battery cell are provided with a fixed frame, the said fixed frame are provided with blocking portions that hold the tabs of the battery cell, the battery cell was sandwiched between two fixed frames. Meanwhile, the said fixed frames are provided with buffer rings sheath the battery cell between them.

Since this technical solution makes use of the soft-package battery cell, so the buffer rings can be made of rubber, the buffer rings sheathe the battery cell, this can play a buffering effect on the battery cell, the buffer ring was sandwiched between two fixed frame, to ensure the position fixed during the operation, the following effects can be achieved, when the battery pack suffers impacts, these can effectively play the role of buffering; in the process of grouping battery cell, tightening the battery module, the soft-package battery cell is protected without extrusion.

In a specific embodiment, the said battery module is provided with a temperature sensor. When abnormality of the battery occurs, the temperature sensor can monitor the changes of the temperature parameters of the battery cell. When battery in normal operation, its parameters are stable, once a failure occurs, a battery cell of the battery pack may swell, the temperature rises sharply, the temperature sensor deposited in the battery pack can detect these changes, and preset comparison values in the temperature sensor, then a corresponding adjustment can be made based on the detection result of the temperature sensor, for example, disconnecting the battery pack from the power supply circuit or decreasing the discharge voltage of the battery pack.

In a specific embodiment, the said temperature sensor is provided at the tabs of the battery module. For the soft-package batteries, the largest part of heat-dissipation locates around the tabs, the temperature changes most is also this part, setting the temperature sensor around the tabs can discover the unusual occurrence of the battery cell at the beginning, after taking timely remedial measures, it can avoid the risk of proliferation, protect the safety of the battery pack.

In a specific embodiment, the positions of the tabs of the both ends of the battery module are provided with a harness assembly, the harness assembly is provided with a harness channel. The sample line that leads from the battery module goes through the harness channel, for example, a temperature sensor harness and so on.

In a specific embodiment, both ends of the tabs of the said battery cell are provided with a fixed frame, the said fixed frame are provided with blocking portions that hold the tabs of the battery cell, the battery cell was sandwiched between the two fixed frames; these designs can hold the battery cell between the fixed frames, maintain the stability of the battery cell, make the tabs easy to expose, easy to connect.

In a specific embodiment, the said fixed frames are provided with buffer rings between them, the said buffer rings sheathe the battery cell.

Since this technical solution makes use of the soft-package battery cell, so the buffer rings are made of rubber, the buffer rings sheathe the battery cell, this can play a buffering effect on the battery cell, the buffer ring was sandwiched between the two fixed frame, to ensure the position fixed during the operation, the following effects can be achieved, when the battery pack suffers impacts, these can effectively play the role of buffering; in the process of grouping battery cell, tightening the battery module, the soft-package battery cell is protected without extrusion.

In a specific embodiment, both end surfaces of the said battery module are provided with a cushion separately.

Expansion will occur in the battery pack during charging, setting cushions separately on both end surfaces of the battery module can play the role of buffering, to avoid accidents after the battery case bursts.

In a specific embodiment, the outer wall of the said case is provided with a plurality of longitudinal reinforcing ribs.

When the battery case is made of the aluminum alloy, setting a plurality of longitudinal reinforcing ribs on the outer wall of the battery case can increase the strength of the battery case, strengthen anti-compression and anti-distortion capability, can also increase the surface area of the case, and optimize the heat-dissipation performance. If the case is made of stainless steel with higher strength like stainless steel, there is no need to set the longitudinal reinforcing ribs on the outer wall of the said case.

In a specific embodiment, the outer surface of the said case is provided with explosion-proof grooves, the notch depth of the explosion-proof grooves is 20%-50% of the wall thickness of the case.

In a specific embodiment, the said explosion-proof grooves include a U-type groove.

When an exception occurs in the internal battery pack, when volume is in rapid expansion, the explosion-proof grooves like U-shaped grooves can break early to achieve the purpose of pressure relief before the pressure reaches the burst pressure of the case, and can guide the direction of the blast, so as to avoid more violent explosion occurrence for the excessive accumulation of internal pressure in the battery case, also to prevent the blast for the separation of the end plates and the case.

In a specific embodiment, the said case is provided with flexible connecting bars connected to the cover.

Setting flexible connecting bars on the case, fixing the connecting bars' other end to the cover, and the two covers are all connected to the case through the flexible connecting bars, when the voltage in the battery case is too large, explosion-proof groove cannot completely guarantee the explosion's not occurrence, in order to prevent the end plate blowing and hurting people, flexible connecting bars can firmly lock the end plate, even if the battery case explosion, the end plate can be guaranteed not to blow and can further enhance the safety performance of the battery pack.

Among them 1, battery module, 11, battery cell, 2, current collector sheet, 21, copper sheet, 22, aluminum sheet, 23, welding groove, 12, fixed frame, 13, harness assembly, 132, harness channels, 14, buffer ring, 15, temperature sensor, 16, sealing sheet, 3, battery case, 33, reinforcing rib, 34, case, 35, cover, 36, flexible connecting bar, 37, U-type groove.

DETAILED DESCRIPTION OF PREFERRED EMBODIMENTS

Example 1

Figure 1:
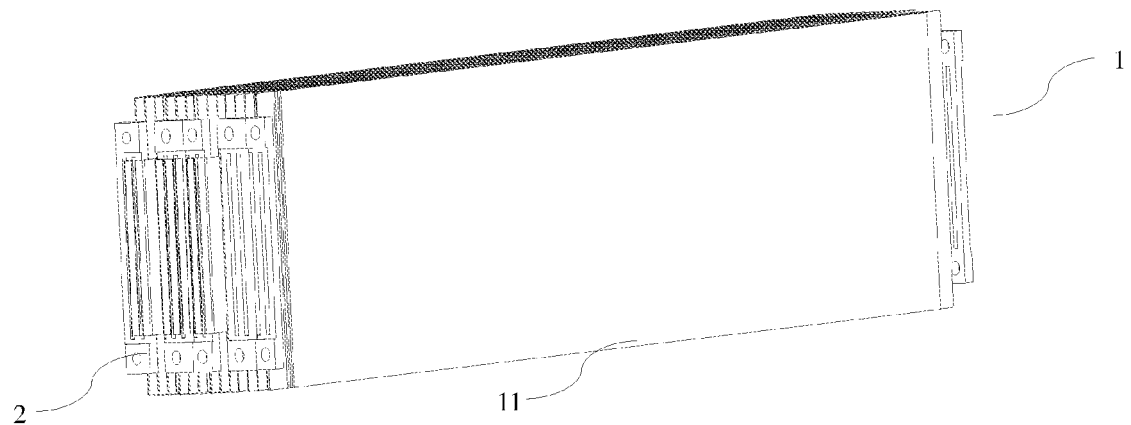
FIG. 1 shows the scheme of the battery module.
Figure 2:
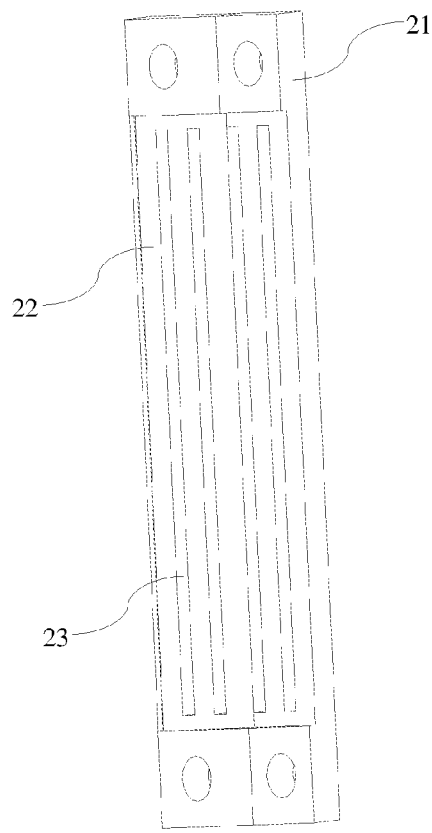
FIG. 2 shows the scheme of the current collector sheet.
Figure 3:
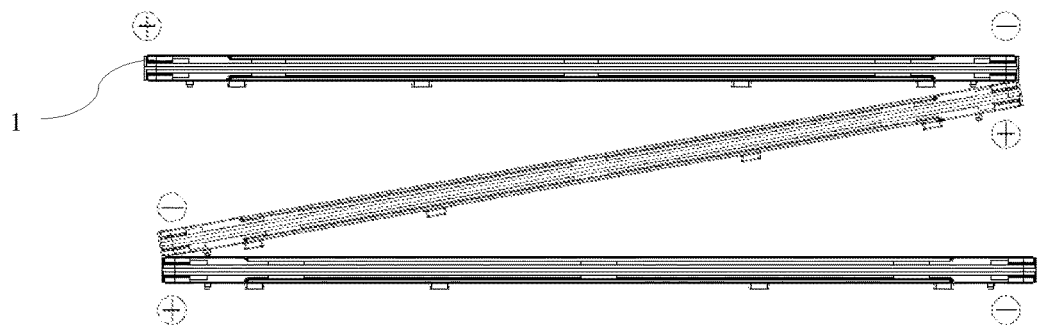
FIG. 3 shows the top view of the battery module.
Figure 4:
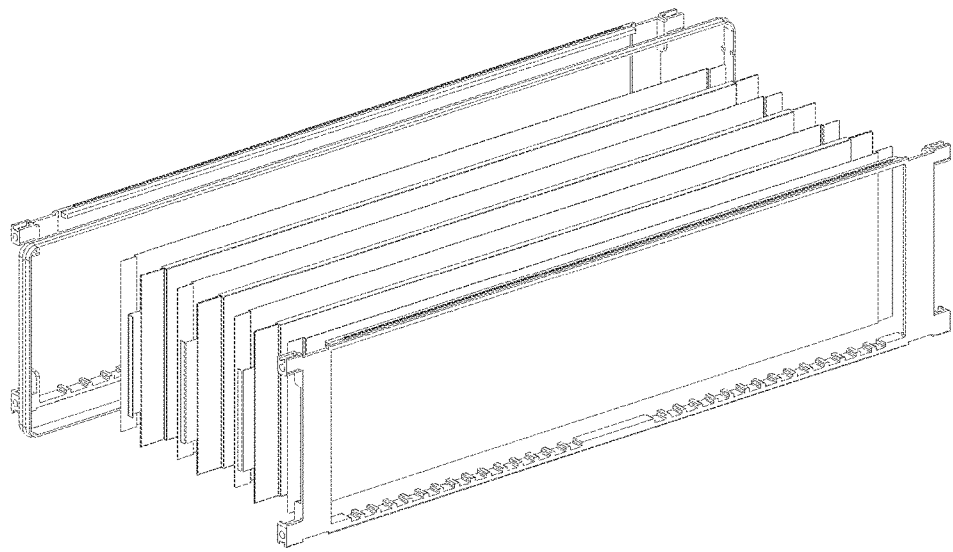
FIG. 4 shows the scheme of the battery module of one embodiment of the present invention.
Figure 5:
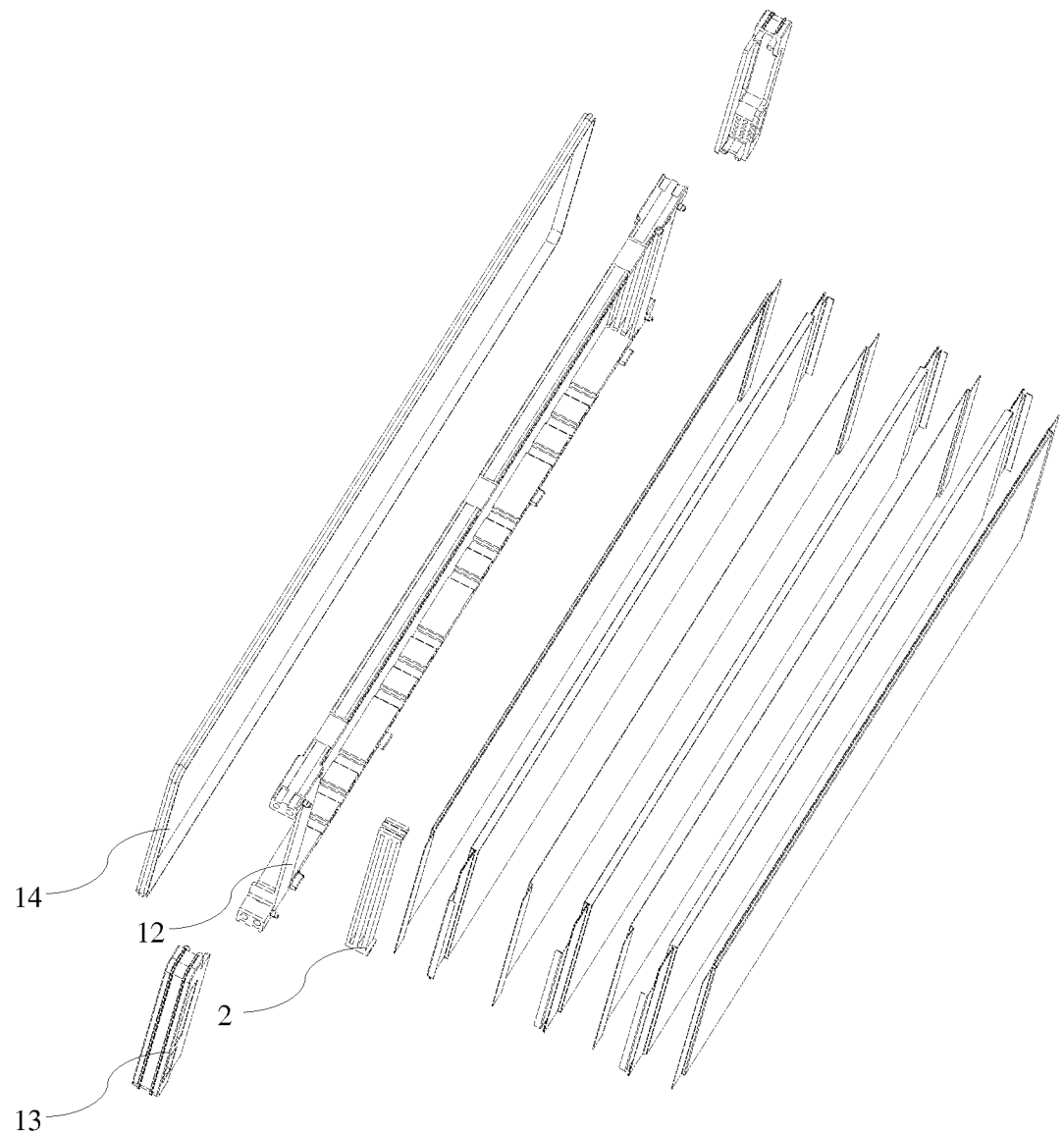
FIG. 5 shows the exploded diagram of the battery module of one embodiment of the present invention.
Figure 6:
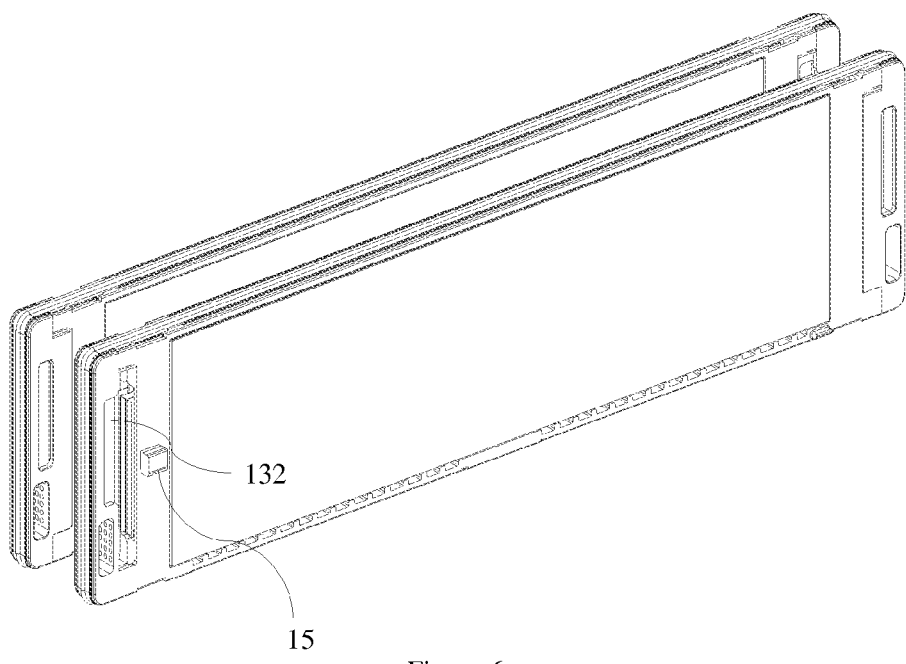
FIG. 6 shows the scheme of the battery module of one embodiment of the present invention.
Figure 7:
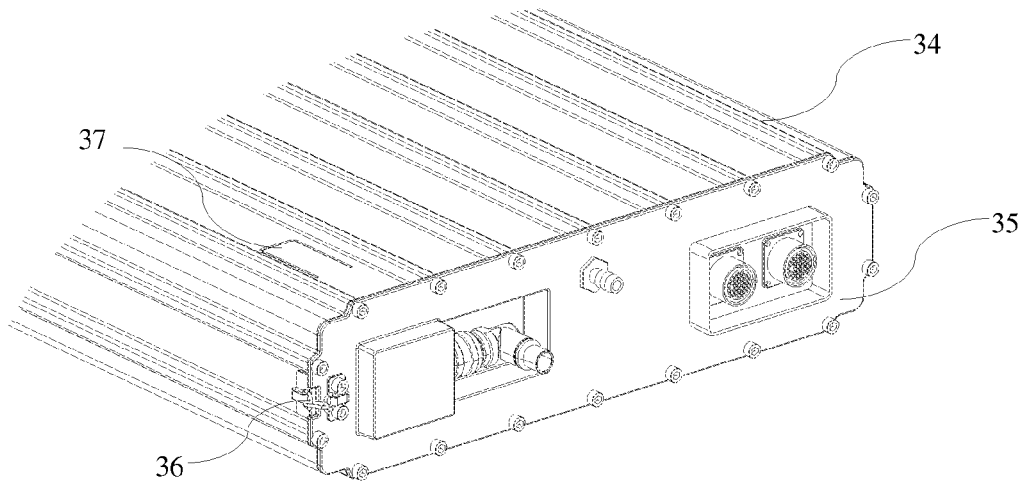
FIG. 7 shows the scheme of the battery case of one embodiment of the present invention.
Figure 8:
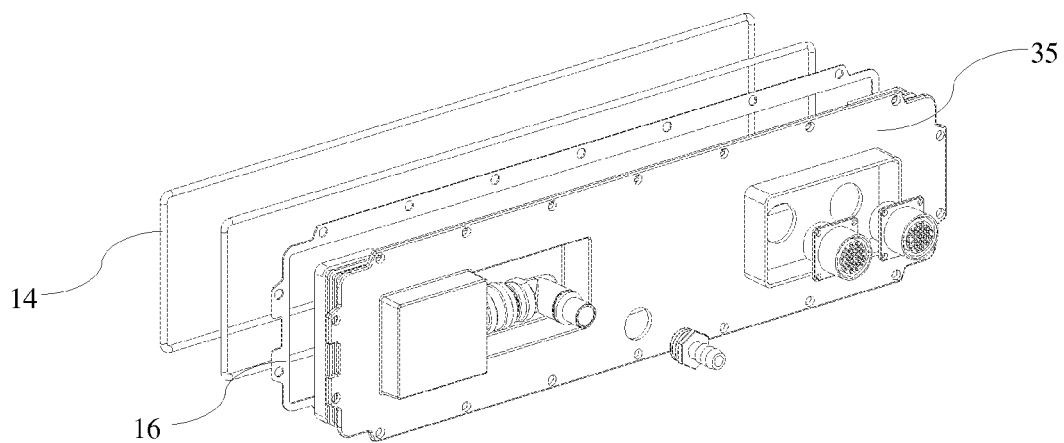
FIG. 8 shows the exploded diagram of the battery case of one embodiment of the present invention.

As shown in FIG. 1 to FIG. 3, the present embodiment provides a battery module 1, comprising a battery cell 11 and a current collector sheet 2, the battery cell 11 is provided with a positive electrode tab and a negative electrode tab, the positive electrode tab and the negative electrode tab are located at the opposite ends of the battery cell 11, the positive electrode tab of the battery cell 11 is an aluminum foil tab, the negative electrode tab is a copper foil tab, the current collector sheet 2 is a combined current collector sheet, the current collector sheet 2 is combined by an aluminum sheet 22 and a copper sheet 21, the aluminum sheet 22 and the copper sheet 21 are fixed by riveting, the aluminum sheet 22 and the copper sheet 21 are respectively provided with a welding groove 23.

In the process of assembling the battery module 1, the battery cell 11 is connected in series first, welding the aluminum foil tab of the battery cell 11 that needs to be connected in series to the welding groove 23 of the aluminum sheet 22, welding the copper foil tab to the welding groove 23 of the copper sheet 21, so that the battery cells of the battery module are connected to form a Z-shaped type from the head to the tail.

The advantage of this embodiment is the ultra-high energy density and the stability of the battery pack structure; the length of the battery pack in present embodiment is 14 dm, the width is 4.3 dm, the height is 1 dm, and the battery pack is composed of 3 in parallel, 96 clusters of battery cells, the length of the electrode sheet is 3.6 dm, the width is 0.8 dm, the thickness is 0.036 dm, the capacity of the battery case 3 is $14*4.3*1=60$ L, the volume of all the electrode sheets in a battery case is $3.6*0.8*0.036*3*96=30$ L, so the EVR is 30/60=50%, is much larger than the EVR of only 25.2% of the battery pack that the Tesla used in the background art, in the premise that the material of the electrode and that of the separator are completely consistent, the battery energy density is greatly improved.

Example 2

As shown in FIGS. 1 to 4, the present embodiment provides a battery module 1, comprising a battery cell 11 and a current collector sheet 2, the battery cell 11 is provided with a positive tab and a negative tab, the positive tab and the negative tab are located at the opposite ends of the battery cell 11, the positive electrode tab of the battery cell 11 is an aluminum foil tab, the negative electrode tab is a copper foil tab, the current collector sheet 2 is a combined collector sheet, the current collector sheet 2 is the combination of an aluminum sheet 22 and a copper sheet 21, the aluminum 22 and the copper sheet 21 are fixed by riveting, the aluminum sheet 22 and the copper sheet 21 are respectively provided with a welding grooves 23; the length of the battery cell to the width of the battery cell is 4:1.

In the process of assembling the battery module 1, the same three battery cell 11 are connected in parallel first, welding the aluminum foil tab of the battery cell 11 that needs to be connected in parallel to the welding groove 23 of the aluminum sheet 22, welding the copper foil tab to the welding groove 23 of the copper sheet 21. Then welding the copper foil tab connected in parallel of the battery cell 11 to the welding groove 23 of the copper sheet 21 of the last battery cells connected in parallel of the positive current collector sheet, welding the aluminum foil tab to the welding groove 23 of the aluminum sheet 22 of the next battery cells connected in parallel of the positive current collector sheet. So that the battery cells of the battery module are connected to form a Z-shaped type from the head to the tail after connected in parallel.

Both ends of the battery module 1 are provided with a fixed frame 12, the battery cell is hold in the middle of the two fixed frames 12, and setting the buffer ring 14 between the fixed frames 12, the said fixed frame 12 is provided with blocking portions that hold the tab of the battery cell.

The advantage of this embodiment is that under a higher energy density ensured, the design of the buffer structure makes the battery pack with a certain degree of shock-proof and impact-resistance ability.

Example 3

As shown in FIGS. 1 to 8, the present embodiment provides a battery module 1, comprising a battery cell 11, a current collector sheet 2, and a battery case, the cover seals the opening of the battery case, the outer wall of the battery case 34 is provided with a plurality of longitudinal reinforcing ribs 33, the battery case 34 and the cover 35 are provided with a buffer ring 14 and a sealing sheet 16 between, the battery cell 11 is provided with a positive tab and a negative tab, the positive tab and the negative tab are located at the opposite ends of the battery cell 11, the positive tab of the battery cell 11 is an aluminum foil tab, the negative electrode tab is a copper foil tab, the current collector sheet 2 is a combined collector sheet, the current collector sheet is the combination of an aluminum sheet 22 and a copper sheet 21, the aluminum 22 and the copper sheet 21 are fixed by riveting, the aluminum sheet 22 and the copper sheet 21 are respectively provided with a welding grooves 23; U-type grooves are set at the outer surface of the case 34 with its notch depth of 20% of the wall thickness of the case 34; the case 34 is provided with flexible connecting bars 36 connected to the cover 35. The length of the battery cell to the width of the battery cell is 4:1.

In the process of assembling the battery module 1, the same three battery cell 11 are connected in parallel first, welding the aluminum foil tab of the battery cell 11 that needs to be connected in parallel to the welding groove 23 of the aluminum sheet 22, welding the copper foil tab 21 to the welding groove 23 of the copper sheet 21. Then welding the copper foil tab connected in parallel of the battery cell to the welding groove 23 of the copper sheet 21 of the last battery cells connected in parallel of the positive current collector sheet, welding the aluminum foil tab to the welding groove 23 of the aluminum sheet 22 of the next battery cells connected in parallel of the positive current collector sheet. So that battery cells of the battery module are connected to form a Z-shaped type from the head to the tail after connected in parallel. The aluminum separator is set between the adjacent battery cells 11 with its surface area larger than that of the battery cell 11, the separator is provided with concave and convex patterns.

The ends of the battery module 1 are provided with a fixed frame 12, the battery cell is hold in the middle of the two fixed frames 12, and setting a buffer ring 14 between the fixed frames 12, the said fixed frame 12 is provided with blocking portions that hold the tab of the battery cell, setting the buffer ring between the fixed frames, the buffer rings sheathe the battery cell, both ends of the battery module are provided with cushions.

Further in the battery pack there is provided with a temperature sensor 15, the temperature sensor 15 is provided around the tab of the battery module 1, when an exception occurs in the battery pack, the temperature sensor 15 will monitor the changes of the temperature parameters of the battery cell. The positions of the tabs of both ends of the battery module 1 are provided with a harness assembly 13, the harness assembly 13 is provided with a harness channel 132, and the sample line that leads from the battery module goes through the harness channel 132.

The advantage of this embodiment is that under a higher energy density ensured, it can provide the detection of the temperature of battery module meanwhile; it is more conducive to improve the safety performance of the battery module.

What is claimed is:

1. A laminated lithium battery module, comprising:
   battery cells; and
   current collector sheets, wherein at least one battery cell is provided with a positive electrode tab and a negative electrode tab, the positive electrode tab and the negative electrode tab are located respectively at opposite ends of the battery cell;
   wherein the positive electrode tab and the negative electrode tab for each battery cell are formed by different material each of the current collector sheet is a combined current collector sheet which is made by a combination of an aluminum sheet and a copper sheet, and the aluminum sheet and the copper sheet are affixed by riveting or welding;
   wherein adjacent battery cells are connected to form a Z-shaped arrangement by a series connection or a parallel connection of at least one current collector sheet;

wherein for each positive electrode tab and negative electrode tab, its one end connects with its corresponding battery cell, and the other end connects with the current collector sheet.

2. The laminated lithium battery module of claim 1, wherein a ratio of a length of the battery cell to a width of the battery cell is about 2:1 to 8:1.

3. The laminated lithium battery module of claim 1, wherein a ratio of a length of the battery cell to a width of the battery cell is about 4:1 to 6:1.

4. The laminated lithium battery module of claim 1, wherein at least one positive electrode tab of the battery cell is an aluminum foil tab or a copper foil tab, at least one negative electrode tab is a copper foil tab or an aluminum foil tab.

5. The laminated lithium battery module of claim 4, wherein the aluminum sheet and the copper sheet are respectively provided with a welding groove.

6. The laminated lithium battery module of claim 5, wherein the copper foil tab is welded on the welding groove of the copper sheet; the aluminum foil tab is welded on the welding groove of the aluminum sheet.

7. The laminated lithium battery module of claim 1, wherein a separator is provided between adjacent battery cells, a surface area of the separator is larger than the surface area of the battery cell.

8. The laminated lithium battery module of claim 7, wherein the separator is formed with concave and convex patterns, the concave and convex patterns being distributed over the entire separator.

9. The laminated lithium battery module of claim 8, wherein the concave and convex patterns are selected from diamond-shaped concave and convex patterns, square-shaped concave and convex patterns, triangle-shaped concave and convex patterns, strip-shaped concave and convex patterns, or orange peel-shaped concave and convex patterns.

10. The laminated lithium battery module of claim 1, wherein the lithium battery module is provided with a temperature sensor, the temperature sensor being provided at the tabs of the battery module.

11. The laminated lithium battery module of claim 1, wherein the positions of the tabs of both ends of the battery module are provided with a harness assembly, the harness assembly being provided with a harness channel.

12. The laminated lithium battery module of claim 1, wherein both ends of the tabs of the battery cell are provided with a fixed frame, the fixed frame are provided with blocking portions that hold the tabs of the battery cell, the battery cell being sandwiched between two fixed frames.

13. The laminated lithium battery module of claim 12, wherein the fixed frames are provided with buffer rings between them, the buffer rings sheathe the battery cell.

14. The laminated lithium battery module of claim 1, wherein both end surfaces of the battery module are separately provided with a cushion.

15. The laminated lithium battery module according to claim 1, wherein the said battery module is provided in a battery case; the opening of the said battery case is sealed by a cover.

16. The laminated lithium battery module of claim 15, wherein the outer wall of the case is provided with a plurality of longitudinal reinforcing ribs.

17. The laminated lithium battery module of claim 15, wherein the outer surface of the case is provided with explosion-proof grooves, the notch depth of the explosion-proof groove is about 20%-50% of the wall thickness of the case.

18. The laminated lithium battery module of claim 17, wherein the explosion-proof groove includes a U-type groove.

19. The laminated lithium battery module of claim 15, wherein the case is provided with flexible connecting bars connected to the cover.

* * * * *